Dec. 16, 1969 C. L. RUTHROFF 3,484,557

SUPERVISORY SIGNALING OVER RADIO-TELEPHONE SYSTEM

Filed Nov. 3, 1966

INVENTOR
C. L. RUTHROFF
BY Roy M. Porter, Jr.
ATTORNEY

United States Patent Office
3,484,557
Patented Dec. 16, 1969

3,484,557
SUPERVISORY SIGNALING OVER RADIO-TELEPHONE SYSTEM

Clyde L. Ruthroff, Holmdel, N.J., assignor to Bell Telephone Laboratories, Incorporated, Murray Hill and Berkeley Heights, N.J., a corporation of New York Filed Nov. 3, 1966, Ser. No. 591,755
Int. Cl. H04m 3/22
U.S. Cl. 179—16 2 Claims

ABSTRACT OF THE DISCLOSURE

An FM radio trunk directly compatible, insofar as the transmission of supervisory signals is concerned, with its connected telephone system. Make and break direct current circuit changes in the telephone system are converted into unipolar, positive and negative pulses by the charge and discharge of a condenser through the same resistor and the voltage developed used to deviate the FM signal in respective directions. A detected positive pulse at the receiver closes a relay which duplicates the desired make condition in the second telephone system. This condition is magnetically held until the holding current is overcome by a subsequent negative pulse.

This invention relates to telephone system radio links and more particularly to methods and means for transmitting supervisory signals over said systems.

The current need for low cost, broadband telephone trunks between pairs of telephone central offices or between one or more telephone subscribers and a central office is ideally supplied by a simple frequency modulated (FM radio link. Typical uses of such a trunk include the transmission of one or more Picturephone channels or a plurality of multiplexed telephone channels. For maximum usefulness without special conversion equipment, such a trunk needs to be compatible with its connected telephone system for the transmission of supervisory signals (on-hook, off-hook and dial pulse information) as well as for the voice and/or video signal.

It is therefore an object of the invention to transmit supervisory signals over an FM radio channel.

In the majority of telephone systems now in use, supervisory signals are transmitted by make and break interruptions of a direct current signaling path comprising the circuit loop in the link between the subscriber and central office and comprising the connections conventionally known as the "E" and "M" leads within a central office or between central offices. These direct current indications can not be directly transmitted over an FM radio link. Under similar circumstances in the prior art, resort has been taken to separate order wire circuits or to inband signaling with tone oscillators which are turned on and off or shifted in frequency to represent designated conditions.

It is a more specific object of the invention to transmit information contained in direct current circuit conditions directly over an FM radio system without the use of expensive auxiliary signaling equipment.

Much simplier than arrangements used in the prior art, the present invention proposes to convert at the transmitter terminal of the radio link, a change from break to make within the telephone terminal circuit into a unipolar pulse of a first polarity, and from make to break into a unipolar pulse of a second and opposite polarity. These pulses are used to deviate the FM signals frequency in respective directions away from the carrier frequency and their presence is therefore transmitted with ease over the given FM radio channel. At the receiver terminal of the radio link, the detected pulse of the first polarity closes a relay, one contact of which duplicates the desired closed circuit or make condition on the connected telephone line. Suitable means cooperating with the relay are provided for maintaining the relay closed after receipt of the first pulse until receipt of a second and following pulse of the opposite polarity. Specifically, another contact on the relay may be used to apply a holding current to the relay. This condition remains until a pulse of the opposite polarity overcomes the holding current and releases the relay.

A feature of the invention resides in the conversion of make and break conditions on a direct current circuit at the transmitter terminal into positive and negative pulses which can be transmitted over an FM radio link.

Another feature of the invention resides in employing the magnetically latched relay at the receiver terminal to convert a pulse of one polarity into a make indication which is held until a pulse of the opposite polarity is received.

These and other objects and features, the nature of the present invention and its various advantages, will appear more fully upon consideration of the specific illustrative embodiments shown in the accompanying drawings and described in detail in the following explanation of these drawings, in which.

Figures 1, 2A, 2B, 2C, 2D:
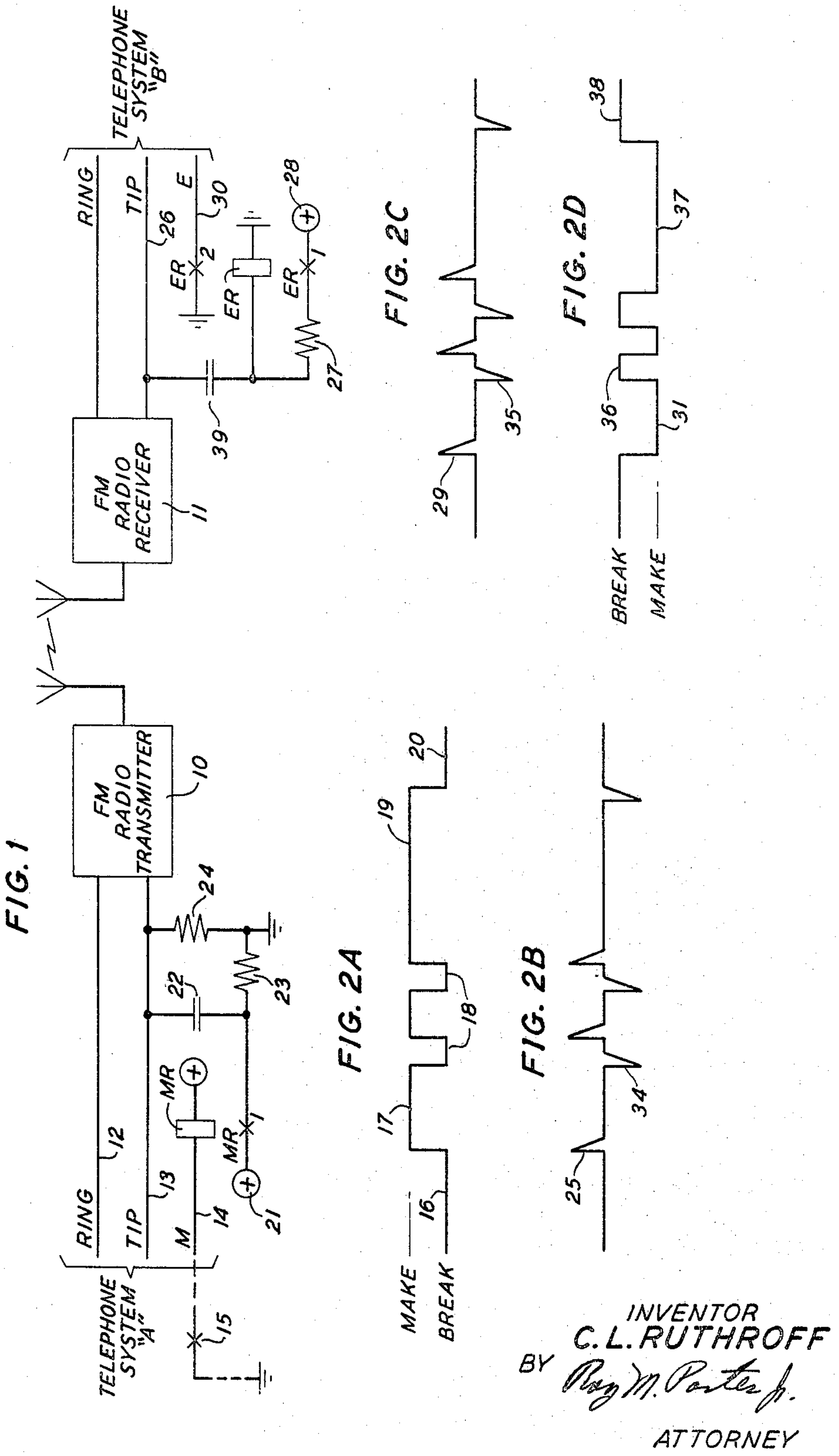
FIG. 1 illustrates in block schematic form a single radio link connecting a circuit having ring, tip and M leads in a first telephone system A to the ring, tip and E leads of a second telephone system B.
FIG. 2A shows typical on-hook, off-hook and dial pulse indications on the M lead of telephone system A.
FIG. 2B shows the conversion of these indications into bipolar pulses.
FIG. 2C shows the detected bipolar pulses after transmission.
FIG. 2D shows the conversion of the received bipolar pulses into on-hook, off-hook and dial pulse information on the E lead of telephone system B.

Referring more particularly to FIG. 1 an FM radio transmitter 10 connected to telephone system A is shown in communication with an FM radio receiver 11 connected to telephone system B. While only a single channel is shown through the radio system it is understood that transmitter 10 and receiver 11 may be multiplex units involving a plurality of channels each connected to a plurality of circuits like the ones to be described. The input circuit of transmitter 10 as shown includes ring and tip leads 12 and 13 respectively upon which the voice and/or video signal from telephone system A are conveyed to transmitter 10 and an M lead 14 over which make and break combinations representing supervisory signals are conveyed in response to operation of a switch or relay contact 15 in telephone system A. It should be understood, however, that telephone system A may be a two conductor subscriber loop in which case the supervisory signals are superimposed on the ring and tip leads and are separated therefrom in accordance with usual practice by a terminating network which converts the two-wire subscriber circuit into the four-wire central office circuit.

A typical chain of make-break supervisory signals as would appear on M14 is shown in FIG. 2A in which the interval 16 represents an on-hook condition, the interval 17 an off-hook condition, intervals 18 dial pulse information, interval 19 a conversation interval, and interval 20 a final on-hook condition. A make condition on lead M14 operates relay MR and its contact 1 applies a positive potential from source 21 across resistor 23 to ground. A series combination of condenser 22 and resistor 24 is connected in parallel with resistor 23 with tip 13 connected to the junction between condenser 22 and resistor 24. When contact 1 closes the full value of source 21 appears across resistor 24 and on tip 13 since condenser 22 is initially discharged by resistors 23 and 24. As condenser 22 charges from ground through resistor 24 the voltage on tip 13 decreases at a rate determined by the RC constant of condenser 22 and resistor 24. In general this time constant is selected so that a relatively sharp pulse is produced on tip 13 as represented by pulse 25 of FIG. 2B. The pulse in turn produces a rapid, unidirectional deviation of the frequency of transmitter 10 and is detected in the output of receiver 11 on tip 26 as a pulse such as pulse 29 of FIG. 2C which is applied to relay ER. Pulse 29 is of sufficient magnitude to close relay ER, contact 1 of which applies a holding potential through resistor 27 from a source 28 of the same polarity but of substantially less magnitude than pulse 29. Thus the holding potential is only large enough to hold relay ER closed after the pulse 29 has passed. Contact 2 of relay ER grounds E30 to produce the conventional off-hook E lead indication as shown by interval 31 of FIG. 2D.

A condenser 39 is shown between tip 26 and the common connection of relay ER and resistor 27 which need only be included if it is undesirable for the holding potential from source 28 to appear on tip 26. Condenser 39 isolates this potential but passes the pulses as desired.

Returning to system A, the first break in the M14 signal, indicating a dial pulse interruption as 18 on FIG. 2A opens relay MR, contact 1 of which removes potential 21 from condenser 22. Condenser 22 then discharges through resistors 23 and 24 in a direction opposite to its charging path direction, and if resistor 23 is small compared to 24, a negative pulse 34 will be applied to tip 13 that is substantially the same size and shape as was the positive pulse 25. The negative pulse is transmitted to receiver 11, appears on tip 26 as represented by 35 of FIG. 2C and its potential appears across resistor 27 with sufficient amplitude to overcome the opposite polarity of source 28. Relay ER opens and produces the appropriate break indication on E lead 30 as represented by interval 36 on FIG. 2D. Similarly, a positive pulse initiates the make condition signifying conversation interval 19 or 37 while a negative pulse initiates the break condition on E lead 30 representing the final on-hook condition 20 or 38.

The simple arrangement of the present invention is made feasible by characteristics of the FM channel itself not found in many of the prior art radio-telephone and carrier systems. Thus the noise free nature of the FM channel removes the danger of false operation of relay ER which could be caused by static, line hits, and telephone system switching transients common on other systems. Further the FM system transmits the bipolar pulses required by the present invention with pulse shape and polarity fidelity and without producing crosstalk and transients on adjacent channels of the system.

In all cases it is to be understood that the above-described arrangements are merely illustrative of a small number of the many possible applications of the principles of the invention. Numerous and varied other arrangements in accordance with these principles may readily be devised by those skilled in the art without departing from the spirit and scope of the invention.

What is claimed is:

1. A system for transmitting information contained in make-break direct circuit path changes of a first telephone communications terminal to a second telephone communications terminal over a radio link from a frequency modulated transmitter to a frequency modulated receiver respectively connected to said links, said system comprising a condenser and means responsive to said change from break to make for applying a charging potential to said condenser, a first resistor included in said charging path whereby a voltage of a first direction is developed across said resistor by said charging current, a second resistor connected to allow said condenser to discharge through said first resistor to develop a voltage in a second direction when said charging potential is removed in response to said change from make to break, means for deviating the frequency of said transmitter in response to the directions of the voltage developed across said first resistor, means connected to said receiver for making a direct current circuit path in said second terminal in response to a received pulse of a first polarity produced by the deviation in said first direction and for holding said last mentioned circuit path until receipt of a pulse of polarity opposite to said first polarity produced by the deviation in said second direction.

2. The system according to claim 1 wherein said means at said second terminal comprises a relay having a given value of holding potential and is operable in response to the receipt of each pulse from said first terminal of said first polarity, means responsive to the operation of said relay for closing a direct current circuit in said second terminal and means responsive to the operation of said relay for applying a potential of the same polarity as said first polarity to said relay, said applied potential being greater than said holding potential and less than the potential of said pulse of the opposite polarity whereby said relay is held in operation until said holding potential is overcome by said pulse of the opposite polarity.

References Cited

UNITED STATES PATENTS

| | | | |
|---|---|---|---|
| 1,657,117 | 1/1928 | Flad. | |
| 2,820,891 | 1/1958 | Philpott et al. | 325—143 |

KATHLEEN H. CLAFFY, Primary Examiner

J. S. BLACK, Assistant Examiner